July 3, 1928.
F. MOKMA
WINDSHIELD WIPER
Filed Feb. 14, 1927
1,675,816
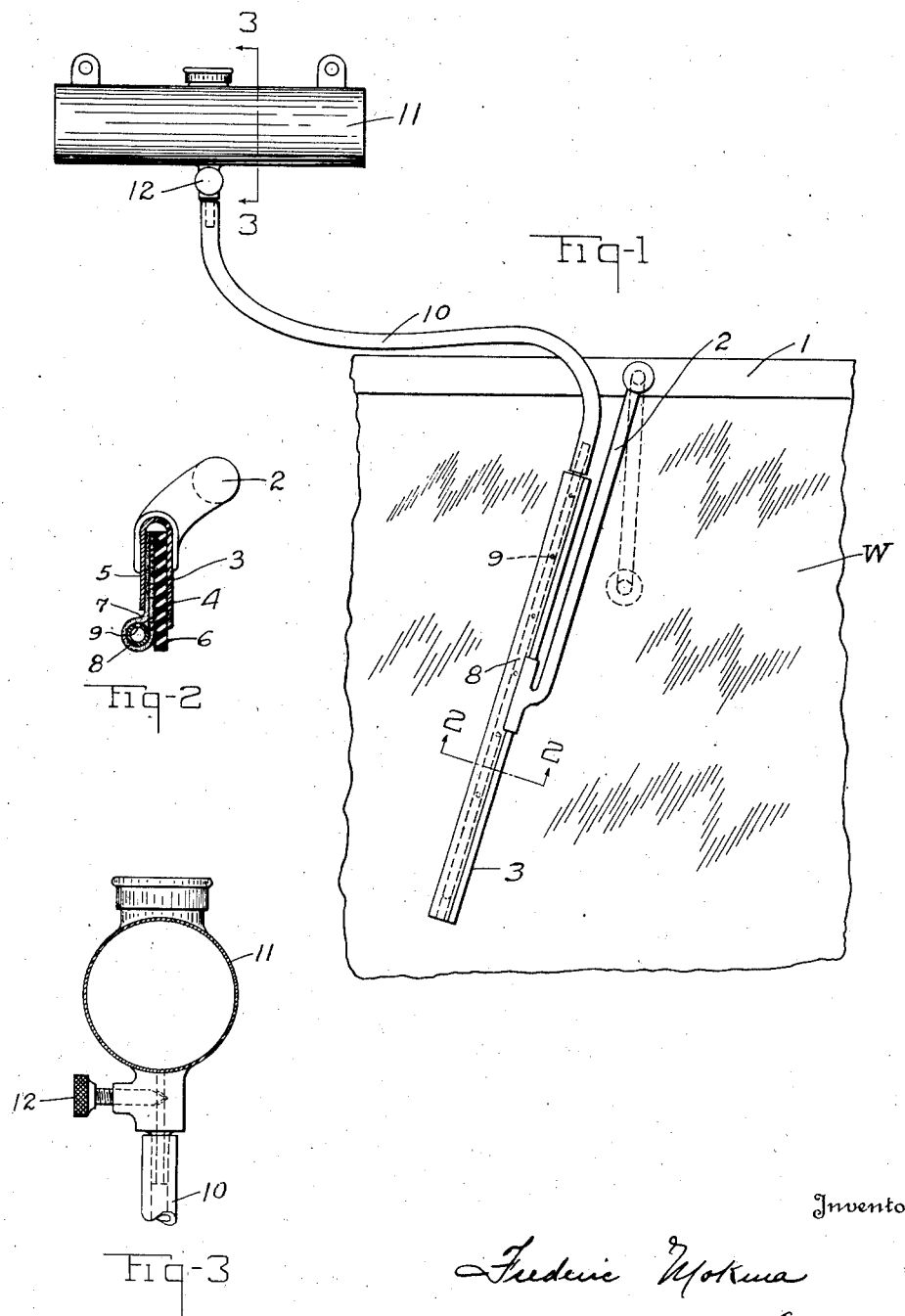

Patented July 3, 1928.

1,675,816

UNITED STATES PATENT OFFICE.

FREDERIC MOKMA, OF SAND CREEK, MICHIGAN.

WINDSHIELD WIPER.

Application filed February 14, 1927. Serial No. 167,921.

This invention relates to window cleaners, but particularly to a wiper for automobile wind shields.

Objects of the invention are to provide a wiper which is effective for removing snow and ice from windows; and to provide a window cleaning mechanism having the new and improved features of construction and arrangement hereinafter described.

For purposes of illustration an embodiment of the invention is shown on the accompanying drawings in which:

Fig. 1 is an elevation of a wind shield wiping mechanism showing the latter mounted on a wind shield; Fig. 2 is a transverse section on the line 2—2 of Fig. 1 showing the parts of the wiper; and Fig. 3 is a section on the line 3—3 of Fig. 1.

The illustrated embodiment of the invention comprises a cleaning mechanism for the wind shield W of an automobile. The wind shield is mounted in a frame 1, to which a substantially U-shaped operating part 2 is attached with one arm on one side of the wind shield, and the other arm on the opposite side of the wind shield. Wind shield wipers having this construction are at present in use so that the above construction forms no part of the present invention.

Attached to the outer arm of the operating handle 2 is a sheet metal holder 3, which is held by soldering to the handle 2. As indicated in Fig. 2 the holder 3 is in the shape of an inverted U with the side 4 wider than the side 5.

Disposed within the holder 3 and adjacent the wider side 4 is a strip 6 of rubber or similar resilient non-metallic material with the lower edge thereof projecting beyond the adjacent edge of the holder 3. For purposes of description the rubber strip 6 is termed the wiping element, and it will be apparent that by swinging or oscillating the arm 2 the lower edge portion of the rubber strip 6 in contact with the wind shield W will wipe from the wind shield any moisture thereon.

Particularly in accordance with this invention a strip 7 of felt or other suitable absorbent material is folded upon itself and disposed in juxtaposed relation to the rubber strip 6, one side of the strip 7 being engaged by the side 5 of the holder 3, and the other side by the rubber strip 6. The folded edge of the strip 7 is substantially coincident with that of the rubber strip 6, and is also engageable with the windshield W.

Disposed within the folded strip 7 is a hollow metallic tube 8 having lateral openings 9 at spaced intervals, preferably terminating a distance from the lower end thereof. Anti-freezing liquid is fed to the tube 8, and this liquid passes through the lateral openings 9 to saturate the felt strip. It will thus be apparent that as the arm 2 is swung across the windshield W in a clockwise direction, the felt applier strip 7 first engages the wind shield and distributes thereover in a uniform manner, a thin film of liquid, and successively the wiper element 6 wipes the liquid film left by the applier so as to leave the windshield perfectly clean.

Although it is understood that any suitable anti-freezing solution or liquid may be used for the purpose, I have found that a mixture of glycerine and alcohol is satisfactory. It will further be understood that although anti-freezing liquid may be supplied to the applier element so as to remove ice and snow from the windshield, under some conditions it may be desirable to feed liquid other than anti-freezing liquids for other purposes, all coming within the scope of the claims which follow.

The upper end of the metal tube 8 projects beyond the holder 3, and attached to this end is a flexible tube 10, through which liquid may flow from a reservoir 11 to the tube 8. The flow of liquid from the reservoir 11 may be controlled by a suitable valve 12. It will be readily understood that the valve 12 may be manipulated so that a continuous flow from the reservoir 11 may be had, and in this manner the cleaning mechanism will operate satisfactorily without the necessity of constant attention.

While I have shown and described a construction which is the best form known to me at the present time, it is to be understood that numerous changes in details of arrangement, construction and operation may be effected without departing from the spirit of the invention, especially as defined in the appended claims.

What I claim as new and desire to secure by Letters Patent is:

1. A windshield wiper comprising an inverted U-shaped holder of elongate form having one side wider than the other, an operating arm fixed to said holder intermediate the ends thereof, a rubber strip between the sides of said holder in abutment with the wider side and having a portion projecting beyond the edge thereof for engagement with a windshield, a folded strip of absorbent material in engagement with the inner side of said rubber strip and held in clamped relation by the other side of said holder, and a tubular perforated stem within said folded strip for feeding liquid to saturate the folded strip.

2. A windshield wiper comprising an inverted U-shaped holder of elongate form having one side wider than the other, an operating arm fixed to said holder intermediate the ends thereof, a rubber strip between the sides of said holder in abutment with the wider side and having a portion projecting beyond the edge thereof for engagement with a windshield, a folded strip of absorbent material in engagement with the inner side of said rubber strip and held in clamped relation by the other side of said holder, a tubular perforated stem within said folded strip for feeding liquid to saturate the folded strip, a liquid reservoir, and a flexible tube connecting said reservoir and stem.

In testimony whereof I have hereunto signed my name to this specification.

FREDERIC MOKMA.